United States Patent Office 2,941,360
Patented June 21, 1960

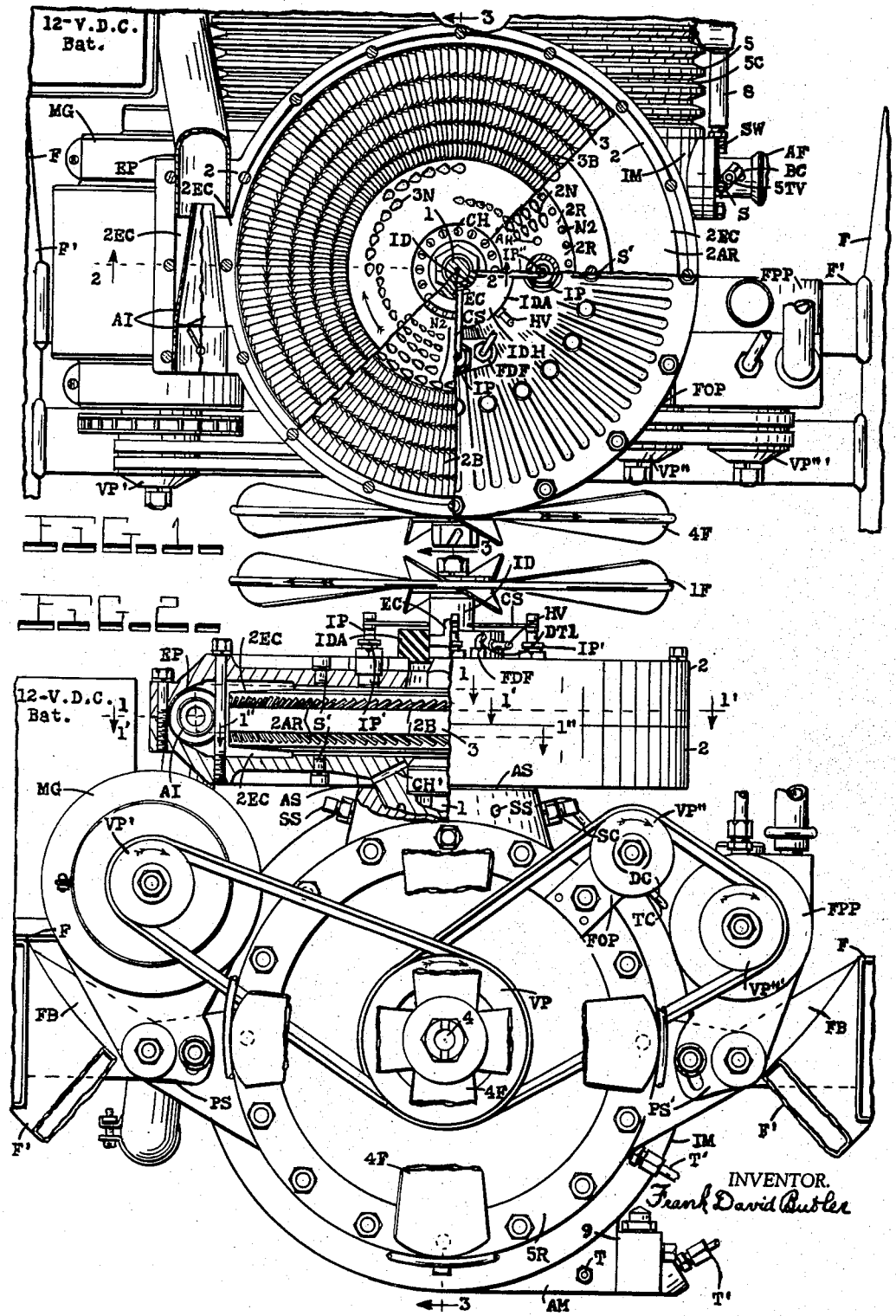

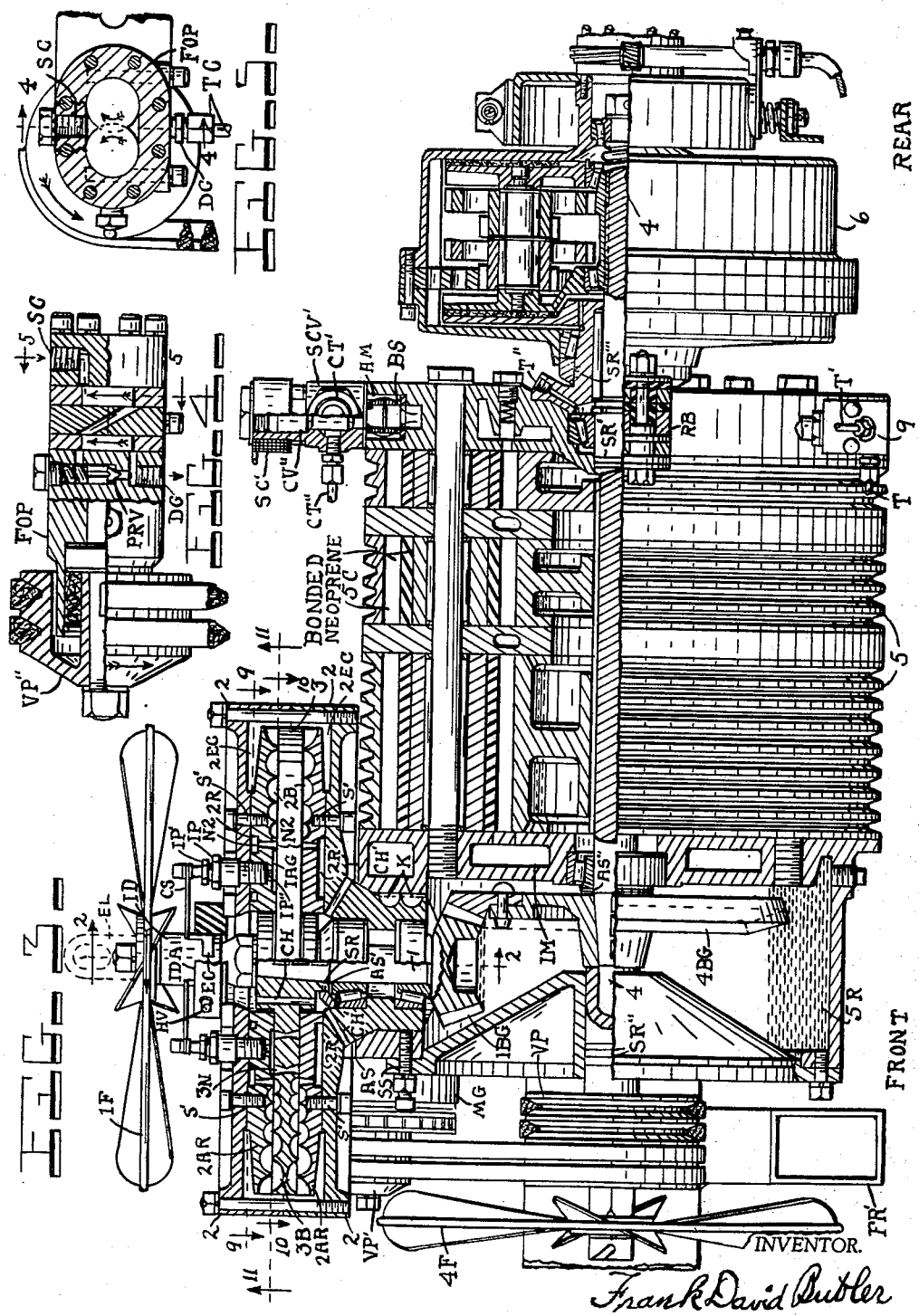

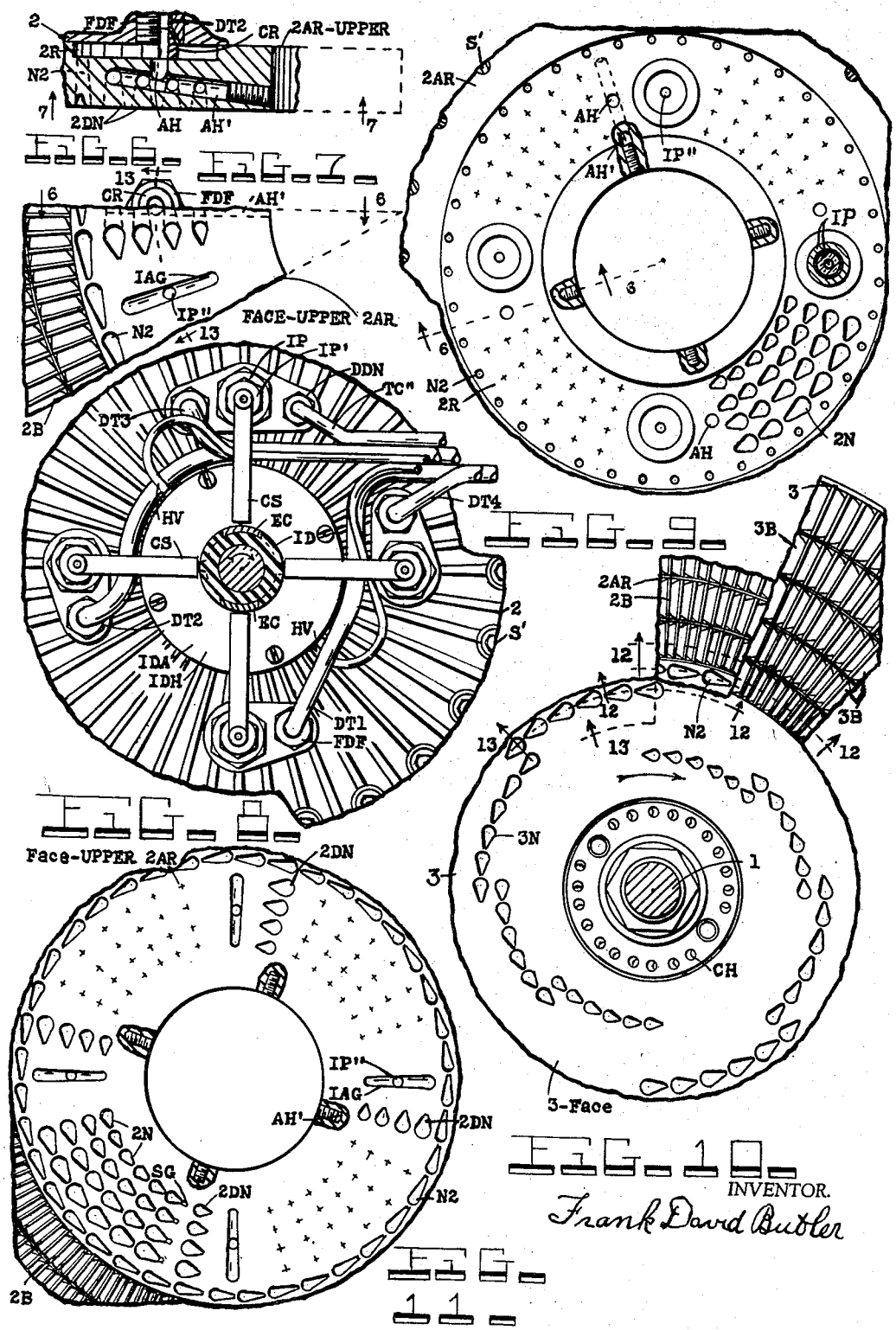

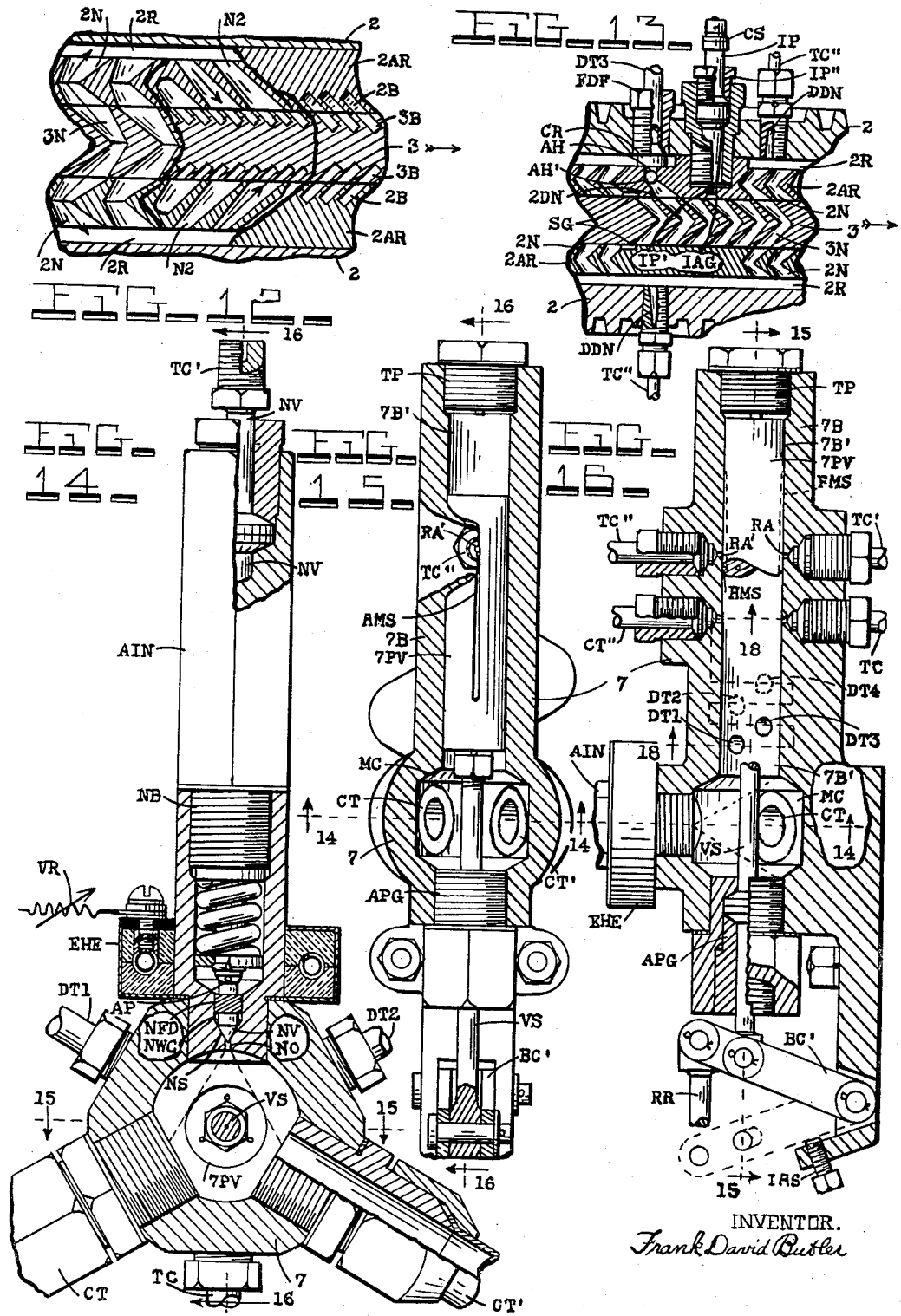

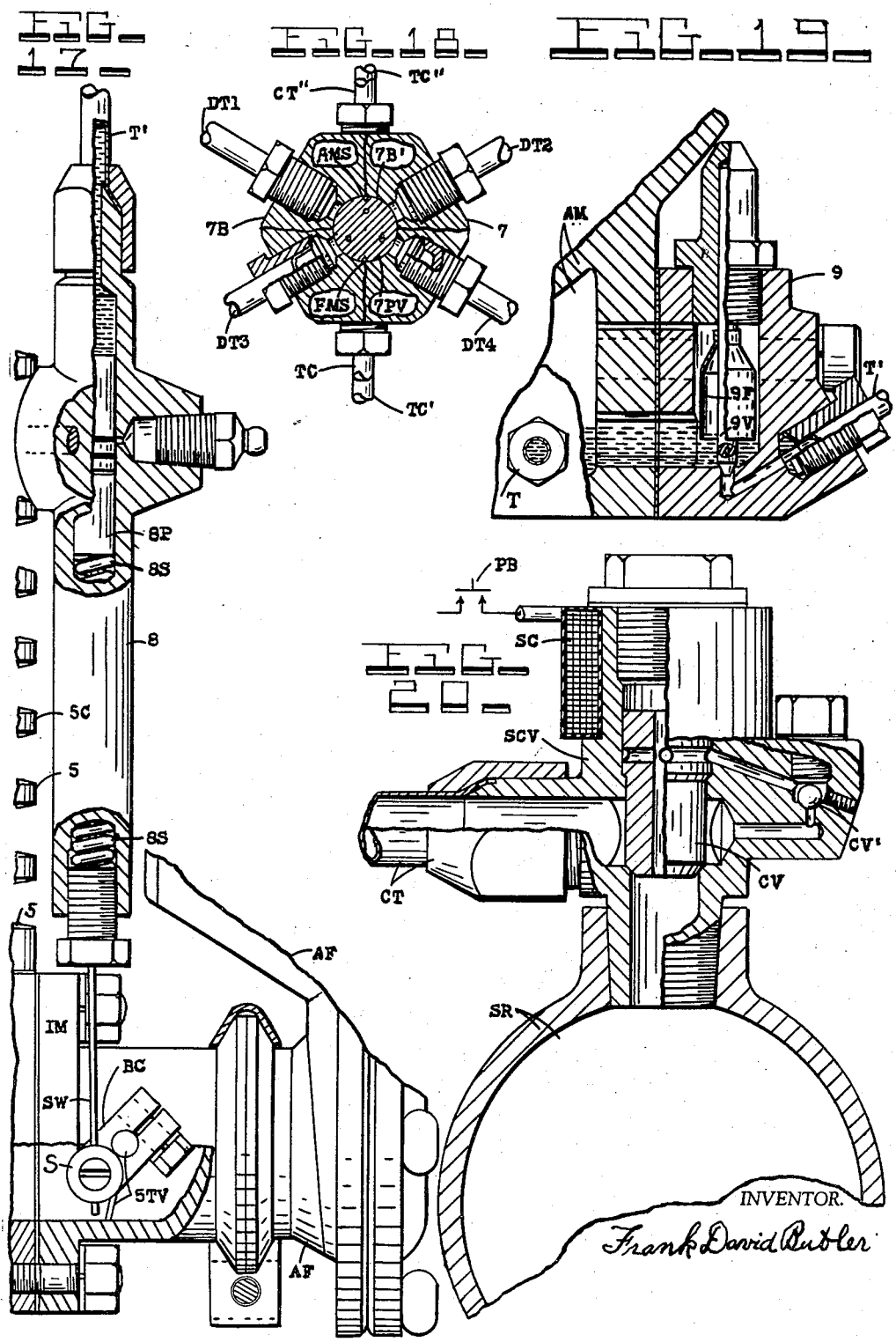

2,941,360

RADIAL FLOW INTERNAL COMBUSTION TURBINE WITH AIR AND FUEL INJECTION MEANS

Frank David Butler, 849 Dickson St., Venice, Calif.

Filed July 27, 1959, Ser. No. 829,767

15 Claims. (Cl. 60—39.34)

While my invention relates in general to combustion turbines, it applies more specifically to axially opposed, combined multiple row reaction jet intermittent axial flow, and multiple row curved bucket radial flow, pressure velocity compounded pressure staged, flame ignition type of multiple expansion group controllable, internal combustion turbines, used in conjunction with unit motive power assemblies applicable to automotive vehicles.

My internal combustion turbine assembly illustrated herein is an improvement over my turbine Patent 2,915,-876 issued 12/8/1959, and is used herein in conjunction with my combined hydrodynamical and quadruple compounded planetary gearing driven, pressure variable ratio reversible, combined torque converter and automatically operative transmission coupler Patent No. 2,799,182, issued July 16, 1957, as provided in tandem with my multiple geared pressure stage compounded elastic fluid compressor Patent 2,876,947 issued March 10, 1959, in forming the unit motive power assembly hereof, and, wherein the patents mentioned are obtainable from the U.S. Patent Office.

Inasmuch as the major objections to internal combustion turbines is the fusion of the turbine rotor and stator combustion chamber nozzles and/or buckets thereof, due to continuous, in lieu of intermittent, combustion being used therein, and, to the fact that all combustion powered means, whether turbines and/or engines, emit vast quantities of hydro-carbon product fumes in the normal exhaust therefrom, and, which normally results in extreme pollution of the atmosphere.

The major concept and improvement in my internal combustion turbine assembly is therefore, the provision of means therein to combat the described major objections thereto, which improvement in my turbine assembly briefly includes: the provision of means therein for producing an axially opposed, reaction jet pressure velocity compounded intermittent flow, of the usual products of combustion of highly compressed elastic fuel mixture supplied thereto and ignited therein, from, a multiple of, axially opposed annular shaped, incomplete rows, of converging V shaped, turbine rotor combustion chamber nozzles, into, a similar number of, axially opposed annular shaped, incomplete rows, of adjacent cooperative, converging V shaped, turbine stator combustion and expansion chamber nozzles; thence into a pair, of axially oppositely located, annular shaped, expansion receiver chambers, which latter are provided and form the turbine's first pressure stage, pressure equalizing receiver means; wherein the latter a metered quantity of highly compressed excess air is provided supplied thereto through a pair of diverging diffuser nozzles, with one of latter provided for each receiver chamber, and for completely burning hydro-carbon and incandescent particles of carbon within each of such receivers; thence such products of combustion flows through a pair of axially opposed annular shaped rows, of diverging axially extending diffuser expansion nozzles, with one row of latter provided within the periphery of each annular shaped opposite receiver chamber, and wherein each diffuser nozzle is provided to extend from latter, axially opposed and in the direction of rotor rotation through its respective, one of a pair of provided, annular shaped radially extending stator rings, to adjacent, an inner row, of a series of rows, of axially opposed, increasing in capacities radially outward, of curved, rotor expansion chamber buckets each provided extending, obliquely in the direction of rotor rotation, into opposite side faces of said rotor; a radially staggered similar series of rows, of axially opposed, increasing in capacities radially outward, of adjacent cooperative curved, stator expansion chamber buckets each provided extending obliquely, in opposite to the direction of rotor rotation, into an adjacent side face of each opposite stator ring; and which series of rows of curved, rotor and stator buckets, in conjunction with said pair of rows of diverging diffuser expansion nozzles, provide and form an axially opposed radial flow pressure velocity compounded, second pressure stage of the turbine, which terminates by the releasing of such expanding products of combustion into an adjacent annular shaped exhaust compartment; which latter surrounds the rotor and the stator rings and is formed within an axially halved stator casing of the turbine, and is in communication with a cylindrical exhaust pipe provided extending tangent to, the periphery of and secured in, said casing; and an elongated converging cylindrical, excess air induction nozzle, provided extending in tandem with said exhaust pipe with its larger end open to surrounding atmosphere and its smaller end projecting a predetermined distance within the adjacent end of said exhaust pipe for inducing such excess air into latter for burning any remaining hydro-carbon therein.

Other improvements in my internal combustion turbine assembly briefly includes: dividing the first pressure stage converging V shaped stator combustion and expansion chamber nozzles into a multiple of radial, quadrant shaped, axially opposed upper and lower, reaction jet intermittent flow, pressure velocity compounded expansion groups, wherein each upper group thereof is provided with a fuel mixture delivery tubing fitting, and an adjacent ignition delivery plug, and, wherein ignition is normally provided in each group with direct flame contact means; an ignition distributor means adjacent the upper expansion group for distributing ignition electricity, twice during each revolution of the turbine rotor, to each ignition plug; a pair of relatively narrow, annular shaped radially extending, stator rings with one disposed adjacent each opposite side face of said rotor and each provided to be secured to the respective adjacent stator casing half; means provided for, conveniently removably, mounting said turbine above and with its shaft extending at right angles to an in-common rotatable shaft of said elastic fluid compressor and said reversible transmission coupler in tandem as forming a part of said unit motive power assembly; my externally located, remotely manually operable, combined liquid fuel and excess compressed air metering, pressure fuel atomizing and injecting, and compressed elastic fuel mixture distributing, turbine control valve assembly, whereby each fuel mixture delivery fitting of each expansion group of the turbine may be consecutively progressively supplied with compressed elastic fuel mixture, and through which the turbine rotor may be started on such compressed fuel mixture; and, other of my improved auxiliary means for the proper operation of the turbine and the unit motive power assembly of which it forms the major part.

With reference to the accompanying drawings, and inasmuch as internal combustion turbine unit motive power assemblies are not at present in use, and must be provided with efficient control and auxiliary operative means, I have provided figures illustrating both such a unit motive power assembly and my recommended auxiliary means for its proper control and operation, and wherein such drawings: Fig. 1 is jointly a broken away plan and a multiple of sections of my turbine, and a portion of the unit motive power assembly, it forms a part of and operates in conjunction with, wherein the lower right quarter is in plan of Fig. 2, the upper right intermediate eighth section is as on the dotted line 1—1 of latter figure, with the upper right one-eighth and upper left three-eighths sections as on the dotted line 1'—1' and with the lower left eighth section as on the dotted line 1"—1". Fig. 2 is jointly a broken away front elevation of said unit motive power assembly as in Figs. 1 and 3, with the section of my turbine as on the dotted and broken lines 2—2 of both of these figures. Fig. 3 is jointly a broken away side elevation and section, with the latter as on the dotted and broken lines 3—3 of Figs. 1 and 2. Fig. 4 is jointly an enlarged broken away plan and section of my combined fuel supply and pressure pump, with the section as on the dotted line 4—4 of Fig. 5. The latter figure is a transverse section as on the dotted and broken line 5—5 of Fig. 4. Fig. 6 is an enlarged detail diagrammatical section portion as along the dotted line 6—6 of Fig. 9, and the broken and dotted line 6—6 of Fig. 7. The latter figure is a diagrammatical plan as along the solid and dotted line 7—7 of Fig. 6. Fig. 8 is an enlarged detail plan of a portion of the turbine of Fig. 1. Fig. 9 is an enlarged detail plan section of a portion of the turbine as on the dotted line 9—9 of Fig. 3. Fig. 10 is an enlarged detail plan of a portion of the turbine rotor as on the dotted and broken line 10—10 of Fig. 3, viewed downward. Fig. 11 is jointly an enlarged plan and diagrammatical section of a portion of one of the turbine annular shaped stator rings as on the dotted line 11—11 of Fig. 3. Fig 12 is an enlarged detail broken away section of a portion of Fig. 10 as along the dotted radius lines 12—12 of latter. Fig. 13 is a broken away detail section of a portion of Fig. 10 as along the dotted radius lines 13—13 of latter. Fig. 14 is an enlarged broken away section through my combined liquid fuel and excess air metering, pressure fuel atomizing and injecting, and compressed elastic fuel mixture distributing control valve assembly, for controlling the expansion groups of my turbine assembly, and as taken on the dotted line 14—14 of Fig. 15. The latter figure is jointly a reduced broken away plan and section of Fig. 14 as on the dotted line 15—15 of Fig. 14, and as on the dotted and broken line 15—15 of Fig. 16. The latter figure is jointly a side elevation and section of Fig. 15, with the section as on the dotted line 16—16 thereof. Fig. 17 is jointly an enlarged broken away detail plan and section of my automatically operative pressure regulating valve (to right in Fig. 1) for regulating the output pressure of my elastic fluid compressor by controlling the inlet air supply thereto. Fig. 18 is a multiple of detail sections of my control valve assembly as on the dotted and broken lines 18—18 of Fig. 16, rotated 90°. Fig. 19 is an enlarged detailed section of my open bottom, hollow closed top bell-type, automatically operative floatvalve assembly, as illustrated in front end elevation in Fig. 2 and in side elevation in Fig. 3, and which is for automatically returning surplus lubricating fluid from the base of the compressor accumulator to the lubricating fluid reservoir. Fig. 20 is jointly an enlarged detail elevation and section of my solenoid coil operative, pressure balanced, fuel mixture starting, check-valve as combined with an automatically operative charging valve, with both connected to the fuel mixture starting reservoir, all for use in starting turbine rotor.

With further reference to the drawings, similar symbols represent and indicate similar parts in the numerous figures, and wherein: The symbol 1 indicates the heat-treated and hardened turbine rotor shaft, the symbol 2 indicates the axially halved type of turbine stator casing, 3 indicates the heat resisting metal turbine rotor, 4 indicates the heat-treated and hardened compressor and coupler driving shaft (copies of my previous patents may be used for detailed reference of both), 5 indicates the compressor body castings, 6 indicates the reversible rotative coupler casing, 7 indicates my manually operative turbine control valve assembly, 8 indicates my automatically operative compressor regulating valve assembly, 9 indicates my automatically operative float-valve assembly, 12 V.D.C. Bat. indicates the 12 volt direct current battery, MG indicates a 12 volt D.C. electrical motor starting and generator unit which is provided with the multiple V pulley VP', FOP indicates my fuel oil supply and pressure pump which is provided with the multiple V pulley VP", while FPP indicates the fluid power pump which is provided with the multiple V pulley VP''' and is used for power steering purposes, and the relatively large diameter multiple V pulley VP is directly driven by shaft 4 and rotatively drives multiple V pulleys VP', VP'' and VP''', and may be rotatively driven by V pulley VP'. The cooling fan 4F is directly driven by shaft 4, while the cooling fan 1F is directly driven by shaft 1. The bevel pinion-gear 1BG is integral with shaft 1 and rotatively drives the bevel ring-gear 4BG, rotatable with shaft 4, at approximately ⅓ the speed of shaft 1, depending upon the relative diameter of the turbine rotor 3. Thus assuming the top speed of shaft 1 is 10,800 r.p.m., then the top speed of shaft 4 would be 3,600 r.p.m. The smaller the diameter of the turbine rotor the higher its allowed speed, thus with medium size unit assemblies the turbine could rotate at 12,000 with the compressor and coupler rotating at 4,000 r.p.m.

With reference to Figs. 6, 7, 10, 12 and 13, it is apparent that by arranging the V shaped rotor combustion chamber nozzles 3N in radially opposite pairs of incomplete rows with each pair of rows at a different radius and with the inner rows of nozzles smaller than the outer rows, with the end nozzles in each row overlapping, in a radial plane, the end nozzles in the succeeding row, that the location of such pairs of rows of nozzles 3N could appear as in Fig. 10. It is further apparent, with reference to Figs. 10 and 13, that with such an arrangement of the combustion and expansion chamber nozzles 3N, that the expansion flow of the products of combustion, from any one of the incomplete rows of nozzles 3N into any adjacent row of V shaped stator combustion and expansion chamber nozzles 2N, would be intermittent and could thereby prevent such nozzles 2N from fusing. It is also apparent that by terminating the rows of nozzles 2N in the receiver chambers 2R, and then originating the diverging nozzles 2N in an annular row, with one such row in each 2R, and terminating each row of nozzles N2 in the inner half of the adjacent inner row of, curved in the direction of rotor rotation, rotor buckets 3B, that regardless of the numbers of quadrant shaped expansion groups that may be in service at the time, the expansion flow of the products of combustion would be continuous from nozzles N2 into the adjacent rows of rotor buckets 3B, and thence into the adjacent rows of, curved in direction opposite to rotor rotation, stator buckets 2B, and thence alternately into the adjacent rows of, increasing in capacity of, buckets 3B and 2B, and the annular shaped exhaust compartment 2EC, past the small end of the converging air induction nozzle AI into the exhaust pipe EP, and thence to the surrounding atmosphere.

With reference to Figs. 4, 5 and 16, my multiple stage geared liquid fuel supply and pressure pump unit FOP is connected at its supply connection SC to a fuel oil supply tank (not illustrated) and is connected at its discharge connection DC to, liquid fuel under pressure supply, tubing connection TC of my distributing control valve unit 7. The pressure relief-valve PRV, of FOP, may be set to deliver liquid fuel at 650 pounds pressure. With reference to Figs. 1, 2, 3, 17 and 19, my compressor regulator unit 8 is connected to the base of compressor 5C accumulator manifold AM by tubing T, which latter is connected to one end of 8 and supplies fluid under pressure against adjacent end of piston 8P, which latter is spring loaded 8S and connected at its opposite end by spring wire SW, swivel S and bell-crank BC, to 5C inlet throttle-valve 5TV, which latter is connected between 5C inlet manifold IM and air filter housing AF. In operation, 8P closes 5TV when pressure in AM exceeds setting of 8S, and vice versa, so thereby regulates the discharge pressure of 5C into AM by regulating automatically the opening and closure of 5TV. With reference to Figs. 2, 3 and 19, my float-valve unit 9 is secured to base of manifold AM, and its hollow float-valve 9F is secured to its vented valve-stem 9V, so whenever fluid rises in AM it enters bottom of 9F, and, by compressing air in latter, lifts it along with 9V, and vice versa. The tubing T' is connected between unit 9 and the combined gearing housing and lubricating fluid reservoir 5R, so all excess fluid is automatically returned from manifold AM to such reservoir 5R.

With reference to Figs. 14 and 20, my push-button PB, solenoid coil SC operative, turbine rotor starting, check-valve unit SCV is provided with a pressure balanced steel check-valve CV and a ball-type charging valve CV', is threaded into the starting fuel mixture reservoir SR, and is connected via the communication tubing CT to my distributing control valve assembly 7. During the period the turbine is in normal operation, the reservoir SR is progressively charged from 7 through tubing CT and the, restricted lift, charging check-valve CV'. When starting the turbine rotor, the electrical push-button PB is pressed, then SC lifts the steel check-valve CV and places SR in communication with the turbine control valve 7 through CT for starting rotor 3.

With reference to Fig. 3, my combined multiple disc, baffled strainer BS and solenoid coil SC' operative, pressure balanced, stop-check-valve SCV' is secured to the top of the accumulator manifold AM and its stop-check-valve CV'' is opened by the solenoid coil SC' whenever the usual ignition switch is turned on, and vice versa. The communication tubing CT' and CT'' are connected to valve 7, Fig. 14.

With reference to Figs. 14, 15, 16 and 18, my combined liquid fuel and excess air metering and pressure fuel atomizing and injecting fuel mixture distributing and turbine control valve assembly 7, consists briefly of: An elongated body 7B having a bore 7B' provided with; an elongated slidable piston valve 7PV, a threaded plug TP closing one end and an enlarged diameter fuel mixing chamber MC adjacent the opposite end thereof, a multiple of radially extending fuel mixture distributing tubing connections DT1 to DT4 provided with, progressively arranged accesses therein, with each tubing leading to one of the expansion groups of the turbine, a liquid fuel pressure supply tubing connection TC having access to 7B', an adjacent liquid fuel outlet tubing connection TC' having a restricted access RA adjacent 7B' for supplying metered liquid fuel to my pressure fuel atomizing and injecting nozzle unit AIN, an air pressure supply connection tubing CT'' having access to 7B', and, an adjacent air outlet tubing connection TC'' having a restricted access RA' adjacent 7B' for supplying metered excess air under pressure via diverging, diffuser type, delivery nozzles DDN into the axially opposite pressure staging receiver chambers 2R of the turbine. The injection nozzle unit AIN is threaded into the top of assembly 7 and extends into mixing chamber MC, while the lower sides of latter are connected by tubing CT' via SCV' (Fig. 3) to top of manifold AM, and by tubing CT to SR via SCV (Fig. 20). Adjacent one end of MC, the body 7B is provided with an adjustable packing gland APG, and a forked end for support of the bell-crank BC' for reciprocating valve stem VS of 7PV, and wherein the reach-rod RR is for oscillating BC' by the usual foot accelerator of the vehicle. The piston valve 7PV is vented and is provided with a pressure thrust towards BC', and is also provided with the opposite pair of elongated, slim tapering V shaped, metering slots FMS for liquid fuel and AMS for excess air, which slots cooperate respectively with restricted accesses RA and RA'. The nozzle unit AIN consists briefly of: The nozzle body NB threaded into top of 7B and provided to slidably receive the elongated, cylindrical, spring-loaded, nozzle valve proper NV, which latter is valve seated in NB at NS, adjacent nozzle orifice NO, nozzle fuel whirling chamber NWC and the multiple threaded nozzle fuel diffuser NFD, and is provided adjacent latter with a reduced diameter, at the opposite end of which a series of access ports AP extend diagonally radially through a shoulder, of an increased diameter, of NV into the bore of latter, which bore and also NV are connected at their opposite ends to the tubing connection TC' for supplying metered liquid fuel under pressure to NWC. Wherein during the operation of AIN, the pressure upon such fuel supply to NWC, acting upon the differential end area of NV, causes latter to be slightly lifted from its seat NS, and thereby results in such fuel being discharged, between the tapering valve end of NV and its seat NS, thence through the nozzle orifice NO, in a whirling minutely atomized spray mist, into the adjacent mixing chamber MC, and wherein the quantity of such fuel being so injected into MC would depend upon the displacement of 7PV in 7B' and consequently upon the resulting cooperation of the fuel metering slot FMS with the restricted access RA, and such quantity of metered fuel would be in the proper proportion to the quantity of compressed elastic fuel mixture that was simultaneously being delivered through DT1 to DT4 to the expansion groups of the turbine at such time. Also simultaneously therewith the proper proportion of excess air under pressure would be supplied to receiver chambers 2R by cooperation of the air metering slot AMS with the restricted access RA'. An electrical heating element EHE is provided surrounding AIN adjacent 7B, for purpose of reducing the viscosity of the oil fuel, and is placed into service whenever the usual ignition switch is turned on, but should also be provided with a remotely controlled variable resistance VR and/or a local thermostatic control.

With reference to Figs. 1 to 3 and 6 to 13 inclusive, each of the multiple expansion groups of the turbine, in addition to other items, is provided with: A compressed elastic fuel mixture delivery fitting FDF which is threaded into the upward half of the axially halved turbine stator casing 2 and seats, at its lower end, against a conical seal-ring CR which latter in turn bears against the upper side of the upward, annular shaped, heat resisting, stator ring 2AR, while at its upper end it is connected to its respective distributing tubing connection such as DT1 to DT4, through which latter compressed elastic fuel mixture is supplied and thence travels downward through FDF and cone-seal-ring CR, into 2AR and the adjacent vertical extending access hole AH and horizontally extending access hole AH' on into any one of the multiple of diverging fuel diffuser nozzles 2DN therein, thence through latter, in the direction of rotor 3 rotation, into any one of the incomplete rows of V shaped combustion chamber nozzles 3N therein 3. Closely adjacent FDF, in the direction of rotor rotation therefrom, I provide an initial ignition delivery plug IP, which latter is provided to be threaded into upward stator ring 2AR and to be shouldered against the upper stator casing 2, and to be provided with an ignition distribution supply, twice each revolution of shaft 1, at its upper end via the conductor strip CS, from my ignition distribution assembly IDA. While in communication with the ignition access hole IP'', at base of IP in face of upper 2AR, I provide a radially extending ignition access groove IAG, which latter, during the distribution of ignition electricity by IDA, is connecting the outer and inner rows of incomplete pairs of rows of nozzles 3N in rotor 3, and, during which period of time a turbulent flow of fresh fuel mixture is passing from one such row into the other, while at other times IAG connects rows of such nozzles 3N, for direct flame contact ignition purposes. With reference to Figs. 11 and 13, each nozzle 2N adjacent each nozzle 2DN in face of upper ring 2AR, and each opposite nozzle 2N in face of lower ring 2AR, see Fig. 13, are each provided with a scavenging groove SG, the dimensions of which will determine the amount of exhaust scavenging each consecutive rotor nozzle 3N will get as it passes the adjacent end of the adjacent nozzle 2DN, and, which may be predetermined.

With general reference to the various figures, the miscellaneous details consists briefly of: For convenience of inspection etc, the turbine proper is secured down against the adjustment shims AS and to the rear towards the two Woodruff keys K by the multiple of diagonally extending set-screws SS surrounding the upper hub of the combined gear housing, inlet manifold IM and fluid reservoir 5R, and may be quickly removed by loosening SS and using a threaded eye-lift EL on the upper end of shaft 1, an in Fig. 3. With reference to Figs. 1, 2, 3 and 8, my ignition distributing assembly IDA, consists briefly of: An annular shaped, electrically insulated ignition distributor ID, pressed over the upper end of shaft 1 and provided with a pair of oppositely located electrical conductors EC moulded therein. An annular shaped, electrically insulated, ignition distributor housing IDH, shoulder bolted, concentric with shaft 1, to top side of upper stator casing half 2 surrounding ID, and provided with a pair of oppositely located, vibrating contact point primary, non-grounded secondary, ignition induction coil high voltage terminal wires HV, which latter are pressed into IDH, 180° apart midway between two ignition plugs IP, and wherein such IDA and the rotation of ID thereof, conductors EC collect vibrating ignition electricity from terminal wires HV and distribute it twice during each revolution of ID to each ignition plug IP, via latters respective connection conductor strip CS. With reference to Figs. 1, 2, 3 and 13, the lower ring 2AR is secured to the lower half of 2 by the annular row of series of capscrews S', while the upper 2AR is secured to the upper half of 2 both by capscrews S' and the multiple of shouldered ignition plugs IP, and wherein the central electrode porcelain of each of latter may be removed for inspection by removal of each respective IP threaded nut IP'. With reference to Figs. 1, 2 and 3, the unit motive power assembly is supported in two front brackets FB, welded to the vehicle frame F, latter having front cross-member F', and in two similar rear brackets RB, only one illustrated, which are each bracket provided with opposite pairs of resilient Neoprene thimbles NT, as illustrated in cut-away Fig. 3. With reference to Fig. 2, the multiple V belts of motor generator MG, are made adjustable by the adjustable pivot support PS of MG, while the multiple V belts of FOP and FPP are both made adjustable by the adjustable pivot support PS' of FPP. With reference to Fig. 3, fluid under pressure is supplied from a foot operated hydraulic unit, not illustrated, for pressure variable ratio reversing the transmission coupler casing 6 through tubing connection T'''. With further reference to Fig. 3, the opposed tapering roller bearings of shaft 1 are adjustable by shims AS', while similar bearings of shaft 4 are adjustable by shims AS'', also wherein rotor 3 is provided with a multiple of non-rotating fluid seal rings SR, shaft 4 is provided with similar rings SR', while hub of VP is provided with similar seal rings SR'', and support hub of casing 6 is provided with seal rings SR'''. With reference to Figs. 1, 2, 3, 9 and 10, the turbine rotor 3 is provided with an annular row of series of, diagonally axially extending, air circulating holes CH located in a hub thereof, while the hub of the lower half of casing 2 is provided with an annular row of series of air circulating access holes CH', which latter extend diagonally radially therethrough such stator hub. The turbine stator halves 2, reservoir 5R, compressor 5C and coupler casing 6 are all air cooled and all such air cooled parts should be made of relatively, high heat conductive, high tensile strength, light weight metal so that relatively high horse power may be developed per pound of the total assembly weight, and such total assembly should be conveniently removable and replaceable, as a unit, from and to framing F.

The axially opposed, multiple row reaction jet intermittent axial flow, pressure velocity compounded, pressure stage initiates in the multiple of rows of V shaped combustion chamber nozzles 3N in rotor 3, and ends in the annular shaped stator rings 2AR, receiver expansion chambers 2R. While the axially opposed, multiple row curved bucket radial flow, pressure velocity compounded, pressure stage initiates in the plurality of rows of diverging expansion nozzles N2, with one row in each 2AR expansion chamber 2R, and ends in the exhaust compartment 2EC.

Thus having fully described my internal combustion turbine assembly, as applied in conjunction with a unit motive power assembly applicable to an automotive vehicle, and with the necessary accessory means for the proper operation of the turbine and its unit motive power assembly.

I claim:

1. In an internal combustion turbine equipped with a relatively narrow, uniform width, side faced, radially extending, turbine rotor secured to rotate with a relatively short rotor shaft suitably journalled to rotate, in one direction within an annular shape radially extending axially halved type of turbine stator casing, and having a fan at an upper end and an integral bevel pinion-gear at the opposite end thereof, and wherein such turbine functions in conjunction with a reversible unit motive power assembly applicable to an automotive vehicle, means provided therein and therewith comprising: a pair of relatively narrow, annular shaped radially extending, stator rings with one disposed adjacent each opposite side face of said rotor and each provided to be secured to the respective adjacent stator casing half; a multiple of annular shaped rows, each located at a different rotor axis radius, of increasing in capacity radially outward, of pairs of, radially oppositely symmetrically disposed, incomplete rows, of converging V shaped rotor combustion chamber nozzles, wherein each of latter extends, axially opposed through the width of said rotor, with its V point in the direction of rotor rotation, and wherein all of said V shaped nozzles are open on each side face of said rotor, and are further provided with the nozzles, located at each end of each pair, of radially opposite, incomplete rows of nozzles, overlapping radially the end nozzles in the next succeeding row of pairs of, radially opposite, incomplete rows of said nozzles; a similar multiple of annular shaped rows, each located at a similar different rotor axis radius, of similar increasing in capacity radially outward, of converging V shaped stator combustion and expansion chamber nozzles provided in each stator ring, wherein the rows of such stator chamber nozzles correspond in number and cooperate with the adjacent row of pairs of incomplete rows of rotor chamber nozzles, and are divided up into a multiple of radial, quadrant shaped, axially opposed, pressure velocity compounded, expansion groups wherein each V shaped stator chamber nozzle thereof extends, axially through the width of its respective stator ring, with its V point in opposite to the direction of rotor rotation, and initiates adjacent said rotor and terminates in an annular shaped receiver chamber, of a pair of axially oppositely located receiver chambers, with one provided intermediately to each stator ring and its respective adjacent stator casing half, and which receiver chambers form the end of an axially opposed reaction jet intermittent axial flow pressure velocity compounded, first pressure stage of the turbine; predetermined means of supply of compressed fuel mixture to latter; a pair of annular shaped rows of axially opposed diverging expansion diffuser nozzles, with each row provided and extending from adjacent the periphery of its respective annular shaped receiver chamber, axially through its respective stator ring in the direction of rotor rotation, to adjacent an inner row, of a series of rows, of axially opposed increasing in capacities radially outward, of curved, rotor expansion chamber buckets provided extending obliquely, in the direction of rotor rotation, into the opposite side faces of said rotor; a radially staggered similar series of rows, of axially opposed increasing in capacities radially outward, of curved, stator expansion chamber buckets provided extending obliquely, in opposite to the direction of rotor rotation, into an adjacent side face of each stator ring; and which series of rows of curved rotor and stator buckets, in conjunction with said pair of rows of diverging expansion diffuser nozzles, provide and form an axially opposed radial flow pressure velocity compounded, second pressure stage of the turbine; wherein said turbine, said axially opposed expansion groups, as provided, are not identical in that, the expansion groups, of the stator ring adjacent the fan end of said shaft, are each provided with a fuel mixture delivery fitting, which latter are each provided, within this stator ring, with an access leading therefrom in-common to a multiple of diverging fuel mixture diffuser nozzles, with one of the latter provided extending, in the direction of rotor rotation, to adjacent each row, of opposite pairs of incomplete rows, of said rotor chamber nozzles, and wherein each expansion group, of this stator ring, is further provided with an ignition plug which latter are each provided, within this stator ring in the direction of rotor rotation from its respective group fitting, with a communication access leading therefrom in-common to adjacent each row, of pairs of opposite incomplete rows, of said rotor chamber nozzles; wherein the latter, fuel mixture under pressure therein, is normally ignited by provided direct flame contact ignition between adjacent consecutive nozzles and between the end nozzles of succeeding rows of pairs of opposite incomplete rows of these rotor chamber nozzles, through each expansion group respective ignition plug communication access, and wherein flow of the products of combustion, of such ignited fuel mixture in each rotor chamber nozzle, is provided to be intermittent from each opposite pair of incomplete rows of axially opposed rotor chamber nozzles into each adjacent axially opposed cooperative row of stator chamber nozzles; an electrically insulated ignition distributor, provided rotative with, said fan end of, said shaft, and a similarly insulated distributor stator, provided surrounding said distributor, which latter and its stator provide a means of distributing ignition electricity, twice during each revolution of said shaft, to each ignition plug; an annular shape exhaust compartment provided within the periphery of, said annular shaped axially halved, stator casing and in communication with a cylindrical exhaust pipe provided extending tangent to, the periphery of and secured in, said casing; an elongated converging cylindrical, excess air induction nozzle, provided extending in tandem with said exhaust pipe with its larger end open to surrounding atmosphere and its smaller end projecting a predetermined distance within an adjacent end of said exhaust pipe for inducing air into latter; a pair of tubing connections, one provided terminating in each opposite receiver chamber, and through which to supply metered excess compressed air into each receiver chamber through a diverging diffuser nozzle, and for burning excess carbon in such receivers and thereby eliminating final exhaust fumes; an externally located, remotely manually operable, combined liquid fuel and excess compressed air metering, pressure fuel atomizing and injecting, and compressed elastic fuel mixture distributing, turbine control valve assembly, whereby each delivery fitting of each expansion group of the turbine may be consecutively progressively supplied with compressed fuel mixture, and through which said turbine rotor may be started on compressed elastic fuel mixture; means provided for, conveniently removably, mounting said turbine above and with its shaft extending at right angles to an in-common rotatable shaft of an in-tandem, elastic fluid compressor and reversible transmission coupler forming the remaining part of said unit motive power assembly, and wherein said in-common shaft is provided with a relatively large diameter bevel ring-gear rotative therewith, and meshing with and rotatively driven by said bevel pinion-gear of the turbine rotor shaft; means forming a part of said unit motive power assembly for mounting it flexibly in a framing of said automotive vehicle; connection means for supplying compressed elastic fluid from an accumulator manifold of said compressor via a combined strainer and check-valve to said control valve assembly; and, a plurality of fans, one operative by said rotor shaft for air cooling said turbine, and the other operative by said in-common shaft for air cooling the compressor and coupler mentioned.

2. The internal combustion turbine of claim 1 characterised by: wherein, the stator ring, adjacent the fan end of the rotor shaft, is secured to its adjacent stator casing half by both an annular row of cap-screws and each of the ignition plugs being threaded thereinto, and shouldered against this stator casing half.

3. The internal combustion turbine of claim 1 characterised by: said means for distributing ignition electricity to each ignition plug, to consist of; said ignition distributor rotor rotatable with the turbine shaft and provided with a plurality of electrical conductors moulded in a periphery thereof; said distributor stator surrounding the distributor rotor and provided with a pair of oppositely located high voltage ignition wires leading from, a non-grounded secondary winding of a vibrating contact point primary winding electrical ignition induction coil, to adjacent said electrical conductors; a plurality of electrical conductor strips one leading from each ignition plug to adjacent the electrical conductors, external to said distributor stator; and, whereby during the rotation of the distributor rotor, the ignition plugs are each supplied with a vibrating alternating ignition distribution supply a plurality of times during each revolution of the distributor rotor.

4. The internal combustion turbine of claim 1 characterised by: wherein each expansion group of the stator ring adjacent the fan end of the turbine shaft is provided consecutively, in the direction of rotor rotation, with; a radial row of increasing in capacities radially outward of diverging fuel mixture diffuser nozzles each extending from a source of supply of compressed elastic fuel mixture obliquely, in the direction of rotor rotation, through this stator ring to adjacent one pair of radially oppositely disposed incomplete rows of converging V shaped rotor combustion chamber nozzles; a plurality of predetermined capacity grooves, with one forming an extended portion of each V shaped stator combustion and expansion chamber nozzle adjacent each fuel diffuser nozzle, for scavenging purposes; an ignition plug provided with an adjacent radially extending access groove which, for direct flame contact ignition purposes, connects each annular row of pairs of incomplete rows of said V shaped rotor combustion chamber nozzles, which latter produce an intermittent axially opposed expansion flow of products of combustion therefrom into the adjacent stator V shaped combustion and expansion chambers; and, thence from latter such products flow into the adjacent, axially oppositely located annular shaped, expansion receiver chambers forming the first pressure stage of the turbine.

5. The internal combustion turbine of claim 1 characterised by: wherein each of said ignition plugs are a combined ignition plug and holddown means, in that an outer annular shaped externally threaded portion, of each plug, is threaded into an upper one of said pair of stator rings and is shouldered against an upper side of an upper half of said axially halved type of turbine stator casing;

and, wherein an inner annular shaped externally threaded portion secures the usual porcelain member of such ignition plug within the outer portion thereof.

6. The internal combustion turbine of claim 1 characterised by: said pair of tubing connections through which to supply metered excess compressed air into each opposite receiver chamber to consist of; one diverging excess air diffuser nozzle threaded into each receiver chamber and connected by this tubing to said distributing, turbine control valve assembly, wherein latter the quantity of excess air is metered in proportion to the number of expansion groups that are simultaneously placed into and/or out of service thereby; and, wherein such excess air is supplied to the turbine's first pressure stage receivers as the most logical place, midway between the point of ignition and combustion of the fuel mixture and its final exhaust, so that all hydro-carbons will be completely burned to carbon dioxide gas prior to the time the products of combustion enters the second pressure stage of the turbine, so there will be no smog produced from the turbine's exhaust gas.

7. The internal combustion turbine of claim 1 characterised by: wherein said elongated converging excess air induction nozzle extending in tandem with said exhaust pipe with its larger diameter end open to the surrounding atmosphere and its smaller diameter end projecting a predetermined distance into said exhaust pipe; thereby forms a means whereby the exhaust passing into such exhaust pipe around such nozzle end produces air induction suction within this nozzle and thereby introduces excess air into such exhaust for burning any remaining hydro-carbons therein to carbon dioxide antismog producing gas.

8. The internal combustion turbine of claim 1 characterised by: wherein said distributing, turbine control valve assembly, consists of: an elongated hexagon body portion having a central bore closed at one end with a threaded plug and open to an enlarged diameter mixing chamber at its opposite end; an adjustable packing gland adjacent said mixing chamber at a forked end of said body portion; an elongated vented non-rotatable piston valve closely slidable within said bore and operative towards said gland by differential end area means and operative away from said gland through a valve stem extending through the packing gland and connected to a bell-crank, which latter is pivoted in the forked end mentioned, and is manually operative through a reach rod connected thereto; a series of tubing connection accesses, one for each expansion group fuel mixture diffuser nozzle supply, each extending radially into said bore and all progressively opened and/or closed by the piston valve and connected externally one to each such fuel mixture diffuser nozzle supply; two slim-tapering V shaped metering grooves located oppositely in the periphery of the piston valve, one in communication with liquid fuel under pressure adjacent one end and a restricted fuel metering orifice at the opposite end thereof, the other in communication with compressed air adjacent one end and a restricted excess air metering orifice at the opposite end thereof; a fuel pressure operative combined pressure atomizer and injector nozzle valve threaded into said body portion and terminating in said mixing chamber at one end and having tubing access connection with the restricted fuel metering orifice at its opposite end; tubing connection access means extending from the restricted excess air metering orifice at one end to each of said receiver chambers at its opposite end; and means whereby, during the slidable operation of the piston valve, simultaneously with the placing into service of each expansion group fuel mixture diffuser nozzles, the quantity of metered fuel, delivered to the pressure fuel atomizer and injector, is increased in proportion thereto as is also the quantity of metered excess air that is delivered to said receiver chambers, and vice versa as such fuel diffuser nozzles are placed out of service.

9. The internal combustion turbine of claim 1 characterised by: wherein said means provided for conveniently removably mounting said turbine above and with its shaft extending at right angles to an in-common rotatable shaft of an in-tandem, elastic fluid compressor, and a reversible transmission coupler forming the remaining part of said unit motive power assembly, and wherein said in-common shaft is provided with a relatively large diameter bevel ring-gear rotative therewith, and meshing with and rotatively driven by said bevel pinion-gear of the turbine rotor shaft, to consist of; providing a lower half of said axially halved turbine stator casing with an integral annular shaped shouldered boss which latter is a close shouldered and keyed fit within a shouldered cylindrical bore extending at right angles to said in-common shaft into an adjacent housing of said bevel ring-gear; a series of nut-locking set screws each extending diagonally downward radially through a boss of said gear housing into the bore of latter, and provided for securing the turbine lower casing half downward against the shoulder of the gear housing and also towards the keyed fit mentioned; adjustment shims located between the shoulders of the lower casing half and the gear housing, for adjusting said bevel pinion-gear and bevel ring-gear to the proper mesh with one another; and, whereby with such an arrangement the turbine rotor will rotate at a higher speed than said in-common shaft, and wherein the entire turbine assembly can be lifted as a unit clear of the compressor and coupler assembly, and, can be carried, by garages etc, as a replacement unit assembly.

10. The internal combustion turbine of claim 1 characterised by: wherein such a turbine assembly, by dividing the annular rows of V shaped axially opposed combustion chamber nozzles, of the turbine rotor, into opposite radially incomplete rows of same, intermittent flow of the products of combustion is made possible, also the axial and radial balance of the turbine rotor can be maintained; and, by providing the pair of axially opposed stator rings with one on each side of the turbine rotor, both the latter and such stator rings can be made of a relatively high heat resisting metal, while the adjacent turbine casing halves can be made of a relatively high heat conductive light weight metal convenient to air cool.

11. The internal combustion turbine of claim 1 characterised by: wherein such type of turbine, the tubing connections for supplying metered excess compressed air into each receiver chamber through a diverging diffuser nozzle for burning excess carbon in such receivers and thereby eliminating final exhaust fumes, constitutes a means of supplying such metered excess air at a location in such type of turbine midway between the point of initial ignition and combustion of the fuel mixture and the point of its final exhaust as expended products of combustion, and, is therefore provided at such timing location as not to affect the initial ignition of the fuel mixture, and yet at a location wherein the temperature of the products of combustion will be sufficiently high to burn any un-burned hydro-carbons remaining in such products of combustion to carbon dioxide gas, and to thereby completely eliminate any smog fumes emitting with the exhaust gas from such type of turbine.

12. In an internal combustion turbine equipped with a relatively narrow, uniform width, side faced, radially extending, turbine rotor secured to rotate with a relatively short rotor shaft suitably journalled to rotate, in one direction within an annular shaped radially extending axially halved type of turbine stator casing, and having a fan at one end and an integral bevel pinion-gear at the opposite end thereof, a combination of means provided therein and therewith comprising: a pair of relatively narrow, annular shaped radially extending, stator rings with one disposed adjacent each opposite side face of said rotor and each provided to be secured to the respective adjacent stator casing half; a multiple of annular shaped rows, each located at a different rotor axis radius, of increasing in capacity radially outward, of pairs of, radially oppositely symmetrically disposed, incomplete rows, of converging V shaped rotor combustion chamber nozzles, wherein each of latter extends, axially opposed through the width of said rotor, with its V point in the direction of rotor rotation, and wherein all of said V shaped nozzles are open on each side face of said rotor, and are further provided with the nozzles, located at each end of each pair, of radially opposite, incomplete rows of nozzles, overlapping radially the end nozzles in the next succeeding row of pairs, of radially opposite, incomplete rows of said nozzles; a similar multiple of annular shaped rows, each located at a similar different rotor axis radius, of similar increasing in capacity radially outward, of converging V shaped stator combustion and expansion chamber nozzles provided in each stator ring, wherein the rows of such stator chamber nozzles correspond in number and cooperate with the adjacent row of pairs of incomplete rows of rotor chamber nozzles, and are divided up into a multiple of radial, quadrant shaped, axially opposed, pressure velocity compounded pressure staged, expansion groups wherein each V shaped stator chamber nozzle thereof extends, axially through the width of its respective stator ring, with its V point in opposite to the direction of rotor rotation, and initiates adjacent said rotor and terminates in an annular shaped receiver chamber, of a pair of axially oppositely located receiver chambers, with one provided intermediately to each stator ring and its respective adjacent stator casing half, and which receiver chambers form the end of an axially opposed, reaction jet intermittent axial flow pressure velocity compounded, first pressure stage of the turbine; predetermined means of supply of compressed fuel mixture to latter; a pair of annular shaped rows of axially opposed diverging expansion diffuser nozzles, with each row provided and extending from adjacent the periphery of its respective annular shaped receiver chamber, axially through its respective stator ring in the direction of rotor rotation, to adjacent an inner row, of a series of rows, of axially opposed increasing in capacities radially outward, of curved, rotor expansion chamber buckets provided extending obliquely, in the direction of rotor rotation, into the opposite side faces of said rotor; a radially staggered similar series of rows, of axially opposed increasing in capacities radially outward, of curved, stator expansion chamber buckets provided extending obliquely, in opposite to the direction of rotor rotation, into an adjacent side face of each stator ring, and which series of rows of curved rotor and stator buckets, in conjunction with said pair of rows of diverging expansion diffuser nozzles, provide and form an axially opposed radial flow pressure velocity compounded, second pressure stage of the turbine; wherein said turbine said axially opposed expansion groups, as provided, are not identical in that, the expansion groups, of the stator ring adjacent the fan end of said shaft, are each provided with a fuel mixture delivery fitting, which latter are each provided, within this stator ring, with an access leading therefrom in common to a multiple of diverging fuel mixture diffuser nozzles, with one of the latter provided extending, in the direction of rotor rotation, to adjacent each row, of opposite pairs of incomplete rows, of said rotor chamber nozzles, and wherein each expansion group, of this stator ring, is further provided with an ignition plug which latter are each provided, within this stator ring in the direction of rotor rotation from its respective group fitting, with a communication access leading therefrom to adjacent each row, of pairs of opposite incomplete rows, of said rotor chamber nozzles; wherein the latter, fuel mixture under pressure therein, is normally ignited by provided direct flame contact ignition between adjacent consecutive nozzles and between the end nozzles of succeeding rows of pairs of opposite incomplete rows of these rotor chamber nozzles, through each expansion group ignition plug communication access, and wherein the expansion flow of the products of combustion, of such ignited fuel mixture in each rotor chamber nozzle, is provided to be intermittent from each opposite pair of incomplete rows of axially opposed rotor chamber nozzles into each adjacent axially opposed cooperative row of stator chamber nozzles; an electrically insulated ignition distributor, provided rotative with said fan end of said shaft, and a similarly insulated distributor stator, provided surrounding said distributor, which latter and its stator provide a means of distributing ignition electricity, twice during each revolution of said shaft, to each ignition plug; an annular shaped exhaust compartment provided within the periphery of said, annular shaped axially halved, stator casing and in communication with a cylindrical exhaust pipe provided extending tangent to the periphery of such casing; an elongated converging cylindrical, excess air induction nozzle, provided extending parallel to the exhaust pipe with its larger end open to surrounding atmosphere and its smaller end projecting a predetermined distance within an adjacent end of said exhaust pipe for air induction into latter; a pair of tubing connections, one provided terminating in each opposite receiver chamber, and through which to supply metered excess compressed air into each receiver chamber through a diverging diffuser nozzle, and for burning excess carbon in such receivers and thereby eliminating final exhaust gas fumes; and, an externally located, remotely manually operable, combined liquid fuel and excess compressed air metering, pressure fuel atomizing and injecting, and compressed elastic fuel mixture distributing, turbine control valve assembly, whereby each fitting of each expansion group of the turbine may be independently progressively supplied with compressed elastic fuel mixture.

13. In an internal combustion turbine equipped with a relatively narrow, side faced, radially extending, turbine rotor secured to rotate with a relatively short rotor shaft suitably journalled to rotate, in one direction within an annular shaped radially extending axially halved type of turbine stator casing, and having a fan at an upper end and an integral bevel pinion-gear at the opposite end thereof, and wherein such turbine functions in conjunction with a reversible unit motive power assembly applicable to an automotive vehicle, means provided therein and therewith comprising: a pair of relatively narrow, annular shaped radially extending, stator rings with one disposed adjacent each opposite side face of said rotor and each provided to be secured to the respective adjacent stator casing half; a multiple of annular shaped rows, each located at a different rotor axis radius, of increasing in capacity radially outward, of pairs of radially oppositely symmetrically disposed, incomplete rows, of converging V shaped rotor combustion chamber nozzles, wherein each of latter extends, axially opposed through the width of said rotor, with its V point in the direction of rotor rotation, and wherein all of said V shaped nozzles are open on each side face of said rotor, and are further provided with the nozzles, located at each end of each pair, of radially opposite, incomplete rows of nozzles, overlapping radially the end nozzles in the next succeeding row of pairs of, radially opposite, incomplete rows of said nozzles; a similar multiple of annular shaped rows, each located at a similar different rotor axis radius, of similar increasing in capacity radially outward, of converging V shaped stator combustion and expansion chamber nozzles provided in each stator ring, wherein the rows of such stator chamber nozzles correspond in number and cooperate with the adjacent row of pairs of incomplete rows of rotor chamber nozzles, and are divided up into a multiple of radial, quadrant shaped, axially opposed, pressure velocity compounded, expansion groups wherein each V shaped stator chamber nozzle thereof extends, axially through the width of its respective stator ring, with its V point in opposite to the direction of rotor rotation, and initiates adjacent said rotor and terminates in an annular shaped receiver chamber, of a pair of axially oppositely located receiver chambers, with one provided intermediately to each stator ring and its respective adjacent stator casing half, and which receiver chambers form the end of an axially opposed reaction jet intermittent axial flow pressure velocity compounded, first pressure stage of the turbine; predetermined means of supply of compressed fuel mixture to latter; a pair of annular shaped rows of axially opposed diverging expansion diffuser nozzles, with each row provided and extending from adjacent the periphery of its respective annular shaped receiver chamber, axially through its respective stator ring, in the direction of rotor rotation, to adjacent an inner row, of a series of rows, of axially opposed increasing in capacities radially outward, of curved, rotor expansion chamber buckets; a radially staggered similar series of rows, of axially opposed increasing in capacities radially outward, of curved, stator expansion chamber buckets; and which series of curved rotor and stator expansion chamber buckets, in conjunction with said pair of rows of diverging expansion diffuser nozzles, provided and form an axially opposed radial flow pressure velocity compounded, second pressure stage of the turbine; and, means for supplying a variable quantity of metered compressed excess air into each of said receiver chambers in proportion to the amount of compressed fuel mixture that is supplied to the turbine, and for burning any hydrocarbon within each of such receiver chambers to carbon dioxide gas and thereby to eliminate any smog fumes that otherwise could be emitted with the exhaust gas from the second pressure stage of the turbine.

14. A multiple pressure staged axially pressure balanced internal combustion turbine provided with: a series of radially extending quadrant shaped, axially opposed reaction jet intermittent flow pressure velocity compounded first pressure stage, expansion groups located adjacent opposite side faces of a relatively narrow radially extending one direction rotatable rotor of said turbine; an axially opposed pair of annular shaped first pressure stage expansion receiver chambers with one located outward axially adjacent axially opposite series of said expansion groups and into which receivers such adjacent expansion groups discharge; means of supply of metered diffused excess air under pressure into each receiver chamber for completely burning hydrocarbons therein; and, a pair of axially opposed annular shaped rings of series of diverging expansion nozzles each extending diagonally axially, in the direction of rotor rotation, through an adjacent annular shaped stator ring of such turbine to adjacent an inner row, of a series of rows, of axially opposed increasing in capacities radially outward, of curved rotor expansion chamber buckets provided extending obliquely axially, in the direction of rotor rotation, into opposite side faces of said rotor and forming the beginning of an axially opposed, radial flow pressure velocity compounded, second pressure stage of said multiple pressure staged internal combustion turbine.

15. A multiple pressure staged axially pressure balanced internal combustion turbine provided with: a relatively narrow, uniform width, side faced, radially extending, one direction rotatable rotor; a pair of relatively narrow, annular shaped, radially extending, stator rings with one disposed adjacent each opposite side face of said rotor and each secured to an adjacent stator casing axial half of said turbine; means forming a part of said stator rings in conjunction with said rotor forming a series of radially extending quadrant shaped, axially opposed, flame ignition reaction jet intermittent flow pressure velocity compounded, first pressure stage expansion groups of said turbine; means forming a part of said rotor and of said stator rings forming an axially opposed, radial flow, pressure velocity compounded, second pressure stage of said turbine; an axially opposed pair of annular shaped first pressure stage expansion receiver chambers with one located outward axially intermediately to each stator ring and the adjacent axial stator casing half and each provided with an annular ring of axially opposed series of diverging expansion nozzles each extending obliquely axially, in the direction of rotor rotation, through the adjacent stator ring to adjacent an inner half of an inner row, of a series of rows, of curved rotor expansion chamber buckets each provided extending obliquely axially, in the direction of rotor rotation, into opposite side faces of said rotor and forming the beginning of said second pressure stage of said turbine; and, means of supply of metered diffused excess air under pressure into each receiver chamber for completely burning products of combustion therein to carbon dioxide, non-smog-producing, gas.

References Cited in the file of this patent
UNITED STATES PATENTS
2,649,685    Cohen _____ Aug. 25, 1953